US008410993B2

(12) United States Patent  (10) Patent No.: US 8,410,993 B2
Jenks et al.  (45) Date of Patent: Apr. 2, 2013

(54) SYSTEMS, METHODS, AND DEVICES FOR HIGHLY INTERACTIVE LARGE IMAGE DISPLAY AND MANIPULATION ON TILED DISPLAYS

(75) Inventors: Stephen F. Jenks, Irvine, CA (US); Sung-Jin Kim, Irvine, CA (US)

(73) Assignee: The Regents of The University of California, Oakland, CA (US)

( * ) Notice: Subject to any disclaimer, the term of this patent is extended or adjusted under 35 U.S.C. 154(b) by 882 days.

(21) Appl. No.: 12/545,026

(22) Filed: Aug. 20, 2009

(65) Prior Publication Data

US 2010/0123732 A1  May 20, 2010

Related U.S. Application Data

(60) Provisional application No. 61/090,581, filed on Aug. 20, 2008.

(51) Int. Cl.
 *G09G 5/00* (2006.01)
(52) U.S. Cl. ...................................................... 345/1.3
(58) Field of Classification Search .................. None
 See application file for complete search history.

(56) References Cited

U.S. PATENT DOCUMENTS

| | | | | |
|---|---|---|---|---|
| 5,657,046 A | * | 8/1997 | Noble et al. | 345/684 |
| 6,208,319 B1 | * | 3/2001 | Nishida | 345/1.3 |
| 6,232,932 B1 | * | 5/2001 | Thorner | 345/1.3 |
| 6,611,241 B1 | * | 8/2003 | Firester et al. | 345/1.3 |
| 7,053,862 B2 | * | 5/2006 | Zerphy et al. | 345/1.1 |
| 7,193,583 B2 | * | 3/2007 | Zerphy et al. | 345/1.3 |
| 7,683,856 B2 | * | 3/2010 | Sakai et al. | 345/1.3 |
| 7,686,454 B2 | * | 3/2010 | Iketani et al. | 353/30 |
| 7,778,842 B2 | * | 8/2010 | Apple et al. | 705/1.1 |
| 7,880,687 B2 | * | 2/2011 | Kondo et al. | 345/1.1 |
| 8,102,333 B2 | * | 1/2012 | Kondo et al. | 345/1.3 |
| 2001/0006375 A1 | * | 7/2001 | Tomooka et al. | 345/4 |
| 2003/0020671 A1 | * | 1/2003 | Santoro et al. | 345/1.3 |
| 2003/0098820 A1 | * | 5/2003 | Someya et al. | 345/1.3 |
| 2006/0256035 A1 | * | 11/2006 | Kondo et al. | 345/1.1 |
| 2009/0201224 A1 | * | 8/2009 | Case | 345/1.3 |
| 2010/0045594 A1 | * | 2/2010 | Jenks et al. | 345/156 |
| 2010/0123732 A1 | * | 5/2010 | Jenks et al. | 345/592 |

* cited by examiner

*Primary Examiner* — Peter Vincent Agustin
(74) *Attorney, Agent, or Firm* — Knobbe, Martens, Olson & Bear, LLP

(57) ABSTRACT

Display units which can be arranged to form a single arrayed display system, thereby allowing the display of much larger images than can be shown on a single display. Each display unit can include an image display, a communication mechanism, such as a network interface card or wireless interface card, and an image display module, such as a video card and an image processor. Each display module can be configured to selectively process and display portions of large digital images.

33 Claims, 7 Drawing Sheets

SYSTEMS, METHODS, AND DEVICES FOR HIGHLY INTERACTIVE LARGE IMAGE DISPLAY AND MANIPULATION ON TILED DISPLAYS

The present application is based on and claims priority to U.S. Provisional Patent Application No. 61/090,581 filed on Aug. 20, 2008, the entire contents of which is expressly incorporated by reference herein.

BACKGROUND

1. Field

This disclosure generally relates to visualization technologies. More specifically, this disclosure relates to display devices which can be used to form a display system formed of tiled arrays of display devices.

2. Description of the Related Art

Traditionally, personal computers and workstations are connected to one or a small number of adjacent display devices, often LCD type monitors. Such systems can provide the user with the ability to view a larger number of pixels than that typically displayable on a single monitor.

Commercially available computer systems can often support one or two monitors for each video controller (sometimes constructed in the form of a "video card") connected to the system. For example, typical "PC" computer systems include several "expansion slots" which can accept certain types of video cards. Motherboards of some "PCs" are built with one or more PCI, PCI Express, AGP, etc., slots that can accept video cards. In this manner, a single computer can be provided with multiple video cards to increase the number of displays that can be controlled by the computer.

SUMMARY

The present disclosure relates to methods and systems for displaying and manipulating large images or datasets. Embodiments of the present disclosure can be particularly advantageous for displaying large digital images that can be tens or hundreds of millions of pixels, or even billions of pixels, on tiled array display systems in a highly interactive manner. Some embodiments can allow for display of datasets that can be over a gigabyte in size. In some embodiments, a system is disclosed that can display a large image on a tiled array display that includes one or more display units and then can manipulate the image by panning, zooming, rotating, color filtering, and the like.

Some embodiments of the systems disclosed herein can be configured in such a way that each of the display units of the system retain a full copy of an original image file (e.g., in local memory) to be displayed, then in parallel, each display unit processes the original image file and displays only that portion of the original image corresponding to the position of the display unit in the overall array. For example, in some embodiments, the display units can be provided with a configuration parameter, indicating in which part of the array the corresponding unit is positioned. For example, in an array of 20 display units formed of 4 rows and 5 columns, the display unit in the upper left hand corner can be identified as the column 1, row 1 display device. The positions of the display units can also be correlated to the ranges of rows and columns of pixels each display unit can display, for example, at their respective "native" resolutions, together forming a "single display" including all of the pixels from each display device.

The display units can also be configured to receive a position command associated with an image file located in each units' local memory. The position command can be any data indicative of the position of the associated image file on the array. For example, the position command can be an identification of the desired location of a predetermined pixel in the associated image. Such a predetermined pixel, for example, can be the pixel at the center of the image that would result from the associated image file being processed at its native resolution. Other predetermined pixels can also be used. Additionally, the position command can include other display characteristics, such as the desired rotational angle of the displayed image, magnification, resolution, etc.

In some embodiments, the display units can be configured to use the received position command to determine what portion (if any) of an associated image corresponds to the pixels of that display unit. For example, the display unit can be configured to determine the requested location of the predetermined pixel of the image resulting from processing of the associated image file, for example, with reference to a virtual wireframe representation of the overall array. Then the display unit can resolve the image file to then determine what portion of the image (if any) corresponds to the display on that display unit.

After obtaining the result of this initial analysis, the display unit can process the image file and display the discrete portion of the resulting image in the correct orientation and thereby, together with the other image portions displayed by the other units in the array, display an observable mosaic of the original image.

As noted above, by configuring the display units to receive a basic position command and then, in parallel, process the position command, process the image file, and display the corresponding portion of the image, the system can generate the desired view of the image more quickly than a system in which an image is broken down and pre-processed into individual parts, which are then individually distributed to the corresponding display unit. Instead, in some embodiments disclosed herein, as the display units receive a series of position commands, which request the display of an image stored on the local memory of each display unit at different locations on the array, all of the display units can re-process and display their respective image portions much more quickly, thereby providing the user with a more responsive and useful system.

Some embodiments of the systems disclosed herein can also allow the display of one or more images that can be larger than the memory of the individual display units in the tiled array display can handle. Conventionally, multiple images can be prohibitively expensive to load due to, for example, disk access times of loading hundreds of megabytes or gigabytes, and a lack of available memory. Advantageously, in some embodiments, each display unit in the tiled array display can be configured to only load or process the data needed for its local portion of the overall image displayed on the tiled array display. The system can thus greatly reduce the amount of data to load into memory, for example, and allows rapid manipulation of the image portions on the individual display units. If more data is needed, the required data can also be loaded and displayed. The system can advantageously employs parallel processing techniques, such as multithreading, to improve system performance.

In some embodiments, each full size or original image can be preprocessed and stored in a hierarchical format that includes one or more sub-images, where each sub-image can be a reduced size or reduced resolution version of the original image. The largest sub-image can be the same size as the original image and/or include image content from the original image. In some embodiments, each sub-image can be stored as one or more blocks, or tiles, to allow rapid access to a particular part of the image without having to access entire rows or columns of pixels. This can advantageously allow a display unit of the tiled array display to determine the discrete portion of an image it needs (e.g., has been requested) to display and to fetch exactly the level of detail, for example the sub-image, and/or to quickly fetch the needed blocks, or tiles, that make up the portion of the image displayed on the display unit. In other embodiments, each sub-image can be stored as one or more resolution layers to allow for rapid access to, and display of, a particular resolution of the original image.

This can be particularly beneficial because only the portion of each original image required for each tile of the tiled array display needs to be resident in the memory of the respective display node. Thus, only the blocks or resolution layers of the appropriate sub-image may need to be loaded, which improves responsiveness of the tiled array display system and performance of the individual display units. In some embodiments, surrounding blocks and blocks from higher and lower levels in the hierarchy can also be pre-fetched for improved performance. This can be advantageous for enabling each tile node to support the display of more than one original image or portions thereof. Additionally, a resource management approach can be used to support increased interactivity by reducing the amount of data loaded into memory, for example, and/or allowing portions of several images to be resident on each individual tile display unit, which supports the display and manipulation of multiple full size images on the array display.

BRIEF DESCRIPTION OF THE DRAWINGS

The above-mentioned and other features of the inventions disclosed herein are described below with reference to the drawings of preferred embodiments. The illustrated embodiments are intended to illustrate, but not to limit the inventions. The drawings contain the following Figures.

DETAILED DESCRIPTION

Figure 1A:
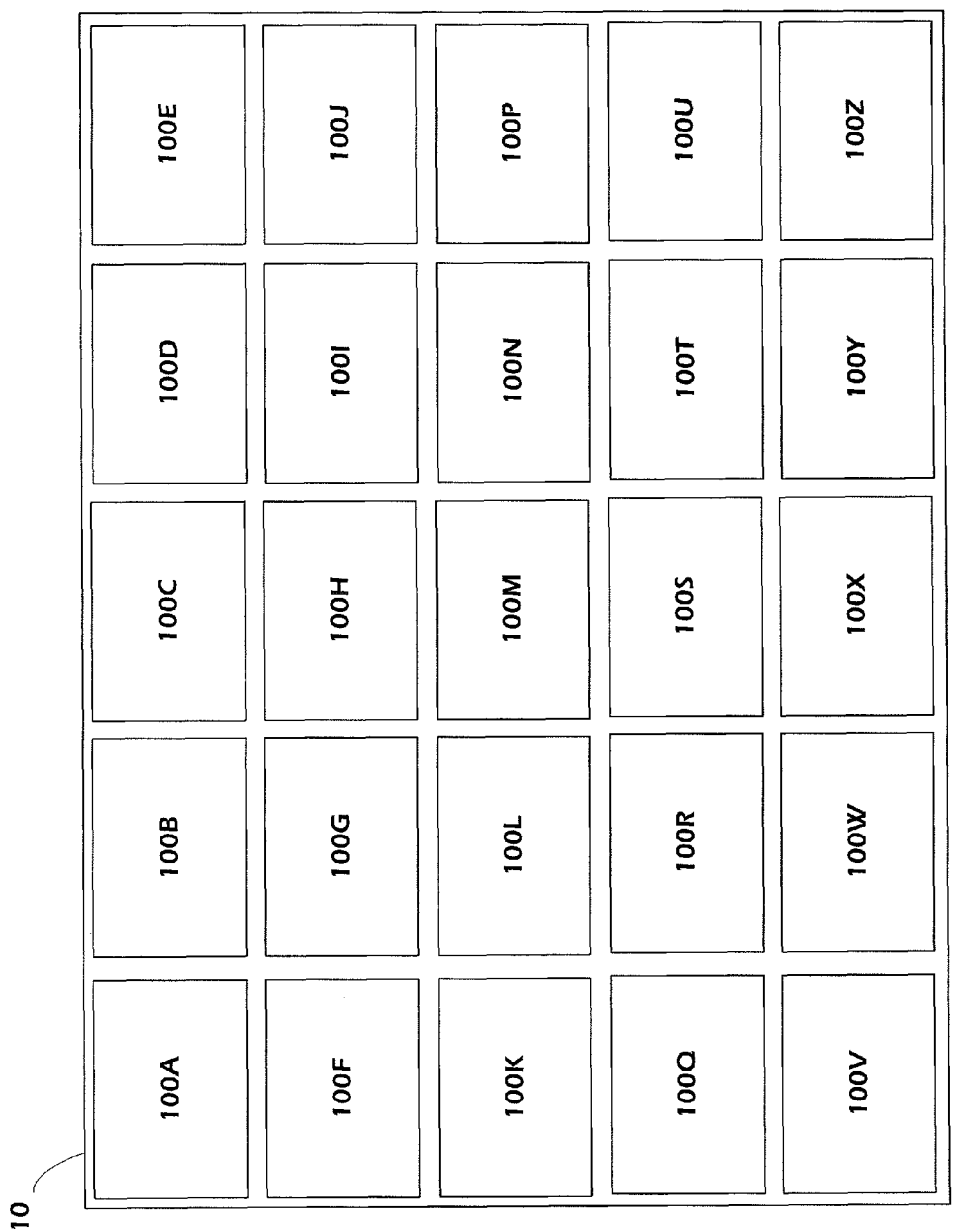
FIG. 1A is a schematic representation illustrating an embodiment of a highly interactive tiled array display.

The present disclosure generally relates to the interactive display and manipulation of large images or large datasets on an array-type display, such as a tiled display system. In some embodiments, a system that implements a highly interactive large image or parallel display system can be used. In some of the embodiments described below, the interactive tiled display system comprises a high resolution, large format display system configured to render large-scale images or datasets on a large array of display units, or "nodes." The interactive tiled display system advantageously allows a viewer to see minute, high-resolution detail in the context of a large overall image.

In some embodiments, the interactive tiled display system allows a user to interact with the display in real-time. For example, embodiments described below can allow panning, zooming, resizing, cropping, rotating, color shading, transparency controlling, and the like of images and/or other content on the tiled display, thereby enabling users to examine content with increased flexibility and effectiveness.

The interactive tiled display system can employ parallel processing techniques (e.g., multithreading) to increase the speed with which the large image or dataset is displayed and/or manipulated on the tiled array display. The use of parallel processing techniques can advantageously result in increased scalability without sacrificing performance.

In some embodiments, the interactive tiled display system comprises a symmetric multiprocessing (SMP) system, wherein each of the tiled display units share the same memory, system bus, and input/output (I/O) system. In other embodiments, the interactive tiled display system comprises a massively parallel processing (MPP) system, wherein each of the display units, or nodes, has its own memory, bus, and I/O system.

In yet other embodiments, the interactive tiled display system comprises a clustered system, wherein each of the display nodes are coupled using local area network (LAN) technology and each of the display nodes comprises an SMP machine. In still other embodiments, the interactive tiled display system comprises a distributed memory parallel processing system, such as a non uniform memory access (NUMA) or distributed shared memory system. In some embodiments, the interactive tiled display system comprises a global shared memory system, such as a uniform memory access (UMA) system. In other embodiments, the interactive tiled display system comprises a cache only memory architecture (COMA) system. In still other embodiments, the interactive tiled display system comprises a parallel random access machine (PRAM) system. Other types of parallel processing systems or modified versions of the above systems can also be used without departing from the spirit and/or scope of the disclosure.

In some embodiments, the interactive tiled display system can comprise, without limitation, one or more of the following parallel processing architectures: linear array, ring array, binary tree, 2D mesh, torus, shared-memory, and hypercube.

In some embodiments, the nodes forming the interactive tiled display systems described below can identify and process a discrete portion of a full image to be displayed on the array. This can reduce the amount of processing required by a control node used to control the nodes, and thus can increase the responsiveness of the overall tiled display system. The interactive tiled display system can also allow for movement of images around the tiled display at a rate that is much faster than other techniques. For example, the interactive tiled display system can be configured to dynamically set up binary trees to increase the speed with which information or data is communicated to the display nodes. The number of binary trees can be dynamically modified (e.g., increased or decreased) depending on communication received from the control node.

Some of the embodiments described below can accommodate viewing of multiple highly detailed, large images, which can exceed billions of pixels, to be displayed as part of a high resolution, coordinated workspace on a tiled display. The real-time or near real-time interaction with the multiple image data, which can be received from multiple image data sources, can include panning, zooming, rotating, color filtering, and transparency control of the images more quickly. The interactive tiled display system can be beneficial for viewing or visualizing various types of image data, such as medical, cancer cells, satellite, geosciences, oil monitoring, weather monitoring or prediction, traffic control, astronomy, artwork, and the like.

In some embodiments, a control unit can function as a front end user interface to allow a user to control the placement and manipulation of content on the tiled array display via user interaction devices (e.g., keyboard, mouse) associated with the control unit. For example, the control unit can include a graphical user interface having a display that "mirrors" the tiled array display. Manipulation of an image on the graphical user interface on the control unit can be used to control manipulation of the image on the tiled array display. Such systems and methods can be useful when a user desires to display an image that is larger than a traditional display connected to a user computer can handle.

Embodiments are described below with reference to the accompanying figures, wherein like numerals refer to like elements throughout. The terminology used in the description presented herein is not intended to be interpreted in any limited or restrictive manner, simply because it is being utilized in conjunction with a detailed description of some specific embodiments of the invention. Furthermore, embodiments of the inventions may include several novel features, no single one of which is solely responsible for its desirable attributes or which is essential to practicing the embodiments herein described.

FIG. 1A is a schematic representation illustrating an embodiment of a highly interactive tiled array display 10. The interactive tiled array display 10 can comprise a plurality of display units 100, wherein each display unit 100 is configured to determine a respective portion of the large image to be output on its associated display and to process and display the respective portion in parallel. For example, the interactive tiled array display 10 includes a 5-by-5 array of display units. In some embodiments, the highly interactive tiled array display 10 comprises a 10-by-5 array of display units (each comprising a 2560×1600 pixel display) to form a 25,600×8,000 pixel display. However, the number of display units 100, and thus, the size of the tiled array is not limited to any particular array size, and can be expanded as large as space and network bandwidth permit.

Figure 1B:
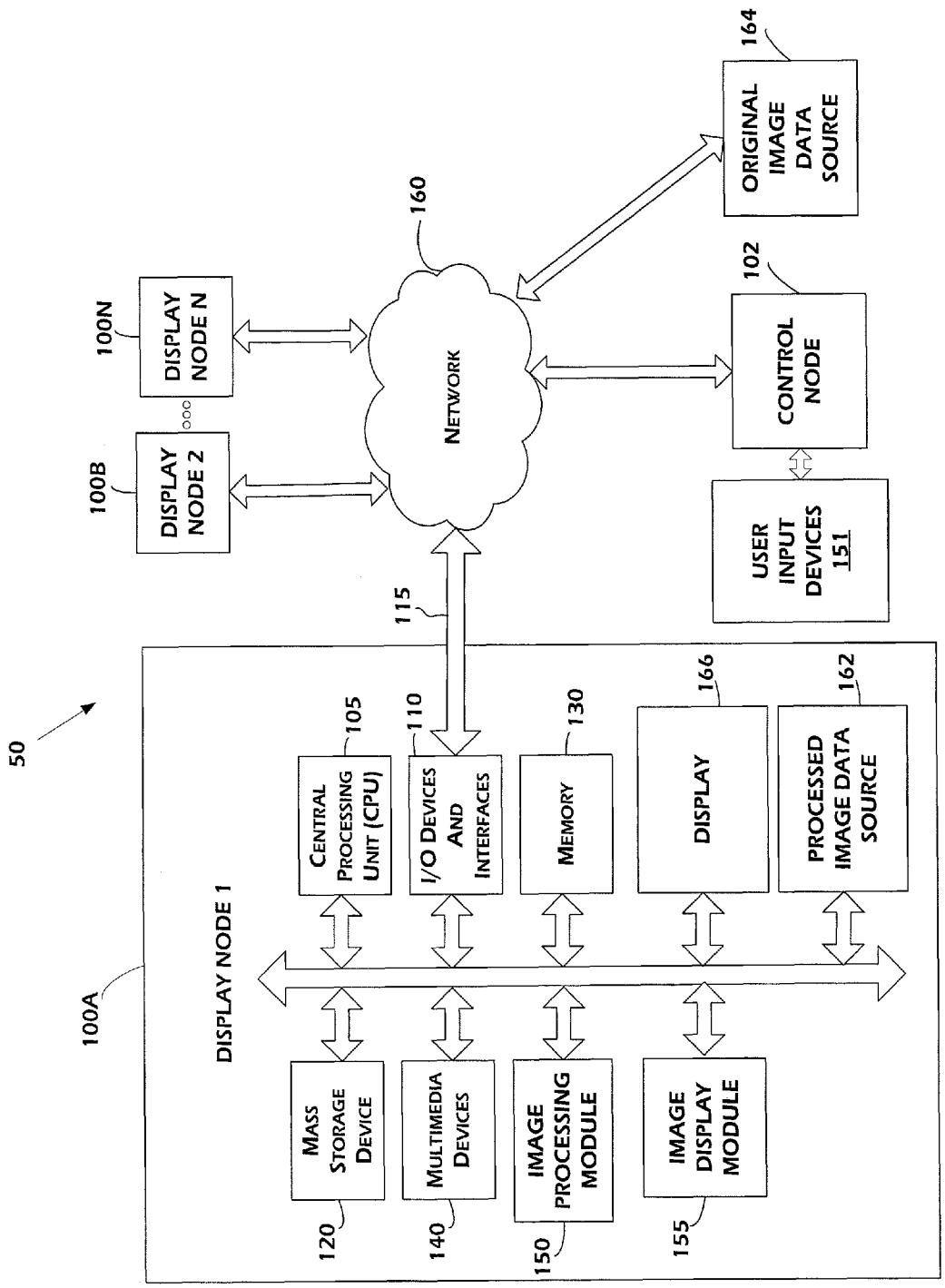
FIG. 1B is a schematic diagram illustrating an embodiment of an interactive tiled display system for displaying and manipulating one or more images on an array-type display.

FIG. 1B is a block diagram illustrating an interactive tiled display system 50 for displaying and manipulating one or more images on an array-type display, such as the highly interactive tiled array display 10, which can be "parallelized." The interactive tiled display system 50 can comprise a plurality of display nodes, or display units 100 (including display nodes 100A, 100B, and 100N that are representative of any quantity of display nodes) that are in communication with a network 160 and other devices via the network 160, including a control node 102. In alternative embodiments, the plurality of display units 100 can be connected in a serial configuration (e.g., a daisy chain implementation) instead of a parallel implementation.

In the illustrated embodiment, an original image data source 164, which can be, for example, a storage device (e.g., a network-attached storage device, a RAID storage system, or a shared local storage over parallel file system, such as a parallel virtual file system (PVFS)) or a computing device, is also in communication with the network 160. In some embodiments, the original image data source 164 comprises a shared memory storage device/file system that is accessible by each of the display nodes 100 via the network 160. The image data source 164 can comprise a plurality of preloaded content, such as large, high-resolution digital images and/or datasets.

Generally, the control node 102 can comprise one or more computer devices that gather or make available information about the state of the overall tiled display system 50, including the display nodes 100, through the use of messages. As used herein, "messages" can be any type of message including data, packets, signals, state values, display parameters, etc., and are referred to interchangeably below as "messages" or "state messages." In some embodiments, the messages comprise "global" messages, which can be broadcast to all the display nodes 100 by the control node 102 via the network 160. The control node 102 can also be configured to transmit such messages to a subset of one or more of the display nodes (e.g., via multicast or unicast message techniques).

The messages can include information about a current state of an image to be, or being, displayed on the tiled array display. For example the messages can include information about a location, size, resolution, orientation, color scheme, or identification of the image. In some embodiments, the messages comprise image data or other data content.

In some embodiments, the communication of messages to the display nodes 100 can be controlled by a multi-port Gigabit Ethernet switch; however other switches, hubs, or routers can also be used. The control node 102 can comprise a desktop computer, laptop, tablet, notebook, handheld computing device (e.g., a smartphone or PDA), a server, or the like. In some embodiments, the control node 102 comprises one or more multi-core and/or multiprocessor computing systems configured for use in implementing parallel processing techniques, such as MIMD or SPMD techniques using shared and/or distributed memory. In addition, the control node 102 can function as a front end user interface to the interactive tiled display system 50 that allows a user to interact with the overall system by manipulating the image or images displayed on its associated display, which in turn manipulates the image or images on the tiled display. Such functions are described in more detail below.

Any of the display nodes 100N and/or the control node 102 can be used to implement the systems and methods described herein. For example, in some embodiments, the display node 100A and the control node 102 can be configured to manage the display of information on tiled display systems. In some embodiments, the control node 102 and the display nodes 100 are configured to implement a shared memory MIMD system and/or a message passing MIMD system. The functionality provided for in the components and modules of the display node 100A and the control node 102 can be combined into fewer components and modules or further separated into additional components and modules.

With continued reference to FIG. 1B, although only exemplary components of the display node 100A are described in detail, it is to be understood that the descriptions of the display node 100A set forth herein also apply to the other nodes 100B, 100N.

In some embodiments, each of the display nodes 100 is configured to render and display a portion of a large, high-resolution image. In some embodiments, all the display nodes 100 work in parallel to render the total overall image across the plurality of display nodes 100, thereby avoiding the performance limitations that would arise from dividing and rendering the entire high resolution image into discrete parts on a single computing device, then transmitting the discrete parts to the corresponding nodes of the tiled array. In some embodiments, the display nodes 100 can display digital images or other data content of 1 gigabyte or larger in size.

In some embodiments, the display node 100A can include, for example, a computing device, such as a personal computer (PC), that is IBM, Macintosh, or Linux/Unix compatible. In some embodiments, the computing device comprises a server, a laptop computer, a monitor with a built-in PC, a cell phone, a personal digital assistant, a kiosk, or an audio player, for example.

In some embodiments, the display node 100A includes a central processing unit ("CPU") 105, which can include one or more multi-core processors, microprocessors, graphics processors, digital signal processors, and/or the like. The display node 100A can further include a memory 130, such as random access memory ("RAM") for temporary storage of information and a read only memory ("ROM") for permanent storage of information, and a mass storage device 120, such as one or more hard drives, diskettes, and/or optical media storage devices. Other arrangements of memory devices can also be used. Thus, the display node 100A can be considered as having a "memory system." Thus, as used herein, the term "memory system" can comprise only one or any combination of the memory device 130, mass storage device 120, processed image data source 162, and any number of additional memory devices 130, mass storage devices 120, processed image data sources 162, or any other type of memory.

Typically, the modules of the display node 100A are connected to the CPU 105 using a standards-based bus system. In different embodiments, the standards-based bus system can be Peripheral Component Interconnect (PCI), Microchannel, SCSI, Industrial Standard Architecture (ISA) and Extended ISA (EISA) architectures, for example. Other types of systems can also be used. Using any of the above or other systems provides for an operable connection between the devices 105, 110, 120, 130, 140, 150, 155, 162, 166, any memory system as described above, or other devices.

The box illustrated in FIG. 1B and identified with the reference numeral 100A, can be considered as a schematic representation of a housing of the display node 100A. Such a housing can be formed in any manner, such as those designs currently used on commercially available monitors or televisions, including LCD, plasma, LED, or other types of devices. Such a housing can be shaped to enclose the devices noted above, for example, enlarged if necessary. Such shaping is fully within the skill of one of ordinary skill in the art of video monitor or television design.

The housing can also include a mount, such as the mounting hardware normally included on the rear sides of the LCD, plasma, LED monitors and televisions that are currently widely available on the commercial market. Such mounts can be described as "wall mounts." Other hardware can also be used. Such hardware can be used in conjunction with an appropriately shaped rack designed to connect to and support a plurality of display nodes 100A having such mounts on their respective housings with the plurality of display nodes 100A arranged adjacent each other, in a tiled layout, such as the layout schematically represented in FIG. 1A.

The display node 100A is generally controlled and coordinated by operating system software, such as Windows 95, Windows 98, Windows NT, Windows 2000, Windows XP, Windows Vista, Linux, SunOS, Solaris, a real-time operating system (RTOS), MAC OS X, or other compatible operating systems. In other embodiments, the display node 100A may be controlled by a proprietary operating system. The operating systems control and schedule computer processes for execution, perform memory management, provide file system, networking, and I/O services, and provide a user interface, such as a graphical user interface (GUI), among other things.

The display node 100A can include one or more input/output (I/O) devices and interfaces 110, such as a keyboard, a mouse, a touchpad, a scroll wheel, a trackball, a voice activation unit, a haptic input device, a printer, or I/O ports. In addition, the display node 100A can include one or more display devices 166, such as a monitor, that allows the visual presentation of data, such as the image data described herein, to a user. In some embodiments, the display device 166 can comprise an LCD display, such as a 30-inch LCD Cinema Display available from Apple, Inc. or a 46-inch 460 UXn-UD LCD display available from Samsung Electronics. In other embodiments, the display device 166 comprises a plasma, CRT, or Organic LED display. In yet other embodiments, the display device 166 comprises a projector-based display. In some embodiments, the display device 166 provides for the presentation of scientific data, GUIs, application software data, and multimedia presentations, for example. The display node 100A may also include one or more multimedia devices 140, such as speakers, video cards, graphics accelerators, cameras, webcams, and microphones, for example.

In some embodiments, the I/O devices and interfaces 110 can provide a communication interface to various external devices. The display node 100A can be coupled to a network 160 that comprises one or more of a local area network (LAN), a wide area network (WAN), a wireless local area network (WLAN), a personal area network (PAN), a virtual private network (VPN), or the Internet, for example, via a wired, wireless, or combination of wired and wireless, communication link 115. The network 160 communicates with various computing devices and/or other electronic devices via wired and/or wireless communication links. In some embodiments, the network 160 comprises an IEEE 802.11g WLAN.

In some embodiments, the display node 100A can include, or may be coupled to via a network connection, a processed image data source 162, such as a database, that includes information about one or more images to display on the tiled array display. The information supplied by the processed image data source 162 can include a full size or original image that was or will be preprocessed and stored in a hierarchical format that includes sub-images, with each sub-image being a reduced size and/or reduced resolution version of the original image. For example, a reduced resolution sub-image can be generated from an original full resolution image by deleting rows and columns of the pixels of the original image at predetermined spacings, thereby generating a lower resolution version of the full image. A reduced size sub image can be generated by cropping the original image. Any other technique of creating sub-images can also be used.

In some embodiments, the largest sub-image can be the same size as the original image and/or include image content from the original image. For example, each sub-image can be stored as one or more blocks, or tiles, to allow rapid access to a particular part of the original image without having to access entire rows and/or columns of pixels. In some embodiments, this can allow the display node 100A to fetch exactly the level of detail (sub-image) it requires and/or to quickly fetch the needed blocks that make up the portion of the image to be output to the display 166. In addition to the devices that are illustrated in FIG. 1B, the display node 100A can be connected to other computing devices through a bus or the network 160.

In some embodiments, the original image data source 164 can include one or more original or full size digital images. The digital images can comprise JPEG, GIF, PNG, TIFF, BMP, and/or other digital image formats. In other embodiments, the original image data source 164 can include one or more original or full size digital images that can be tens or hundreds of millions of pixels (e.g., 200-600 Megapixels), or even billions of pixels. In some embodiments, the display node 100A can preload and preprocess the original images stored in the original image data source 164 and store the result in a hierarchical format in the processed image data source 162. In other embodiments, the display node 100A can determine the correct portion(s) of the original image(s) to be displayed on its associated display 166 and output the corresponding preprocessed image data for display. Thus, the processed image data source 162 can be used to reduce the amount of data that needs to be loaded in memory and support faster manipulation or modulation of images on the tiled array display.

In some embodiments, the hierarchical format used for storing the processed image data comprises a tiled pyramidal TIFF format. However, other formats can also be used.

The tiled pyramidal TIFF format can allow the display node 100A to store multiple resolutions of a preloaded image in the mass storage device 120, memory 130 or in the processed image data source 162. In addition, the tiled pyramidal TIFF format can allow the display node 100A to partition the original image into smaller tiles of data so as to reduce the amount of image data to be fetched and processed, thereby enhancing system performance.

In some embodiments, the original images stored in the original image data source 164 can be compressed or uncompressed images. In some embodiments, the processed image data source 162 can also be configured to receive a compressed image from the original image data source 164. Once received, the display node 100A can decompress an original image and then preprocess the original image into a set of one or more images that are compressed or decompressed and store them in the processed image data source 162, in the mass storage device 120, or in memory 130. In some embodiments, each tile of the tiled pyramidal TIFF images can be compressed using lossless or lossy compression algorithms, such as Deflate, LZW, or JPEG. Spatial identifiers can be used to identify various portions or resolutions of the sub-images to facilitate efficient extraction of different regions or resolutions of the original image(s).

In some embodiments, one or more of the image data sources may be implemented using a relational database, such as Sybase, Oracle, CodeBase and Microsoft® SQL Server, as well as other types of databases such as, for example, a flat file database, an entity-relationship database, an object-oriented database, and/or a record-based database.

With continued reference to FIG. 1B, in some embodiments the display node 100A can also include application modules that can be executed by the CPU 105. In some embodiments, the application modules include the image processing module 150 and the image display module 155, which are discussed in further detail below. These modules can include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In some of the embodiments described herein, each display node 100A can be configured to execute instructions in the image processing module 150, among others, in order to support user interactivity by reducing the amount of data loaded into the memory 130 when an image needs to be displayed on the interactive tiled display system 50. In addition, the image processing module 150 can allow portions of several images to be resident on the display 166, thus supporting display and manipulation of multiple large images across the multiple display nodes 100. For example, in some embodiments, an original large image can be tens of billions of pixels. The image processing module 150 can preprocess and store multiple full size or original images by determining the correct portion of the original images to be displayed on a specific display node 100.

In some embodiments, each original image can be stored in a hierarchical format (e.g., tiled pyramidal TIFF format) that includes sub-images that can be a reduced size and/or reduced resolution version of the original image. In some embodiments, the largest sub-image can be the same size as the original image and/or include image content from the original image to support resizing of the image, such as zooming in and/or out. The image processing module 150 can store each sub-image of the original image as one or more blocks, or tiles, to allow rapid access to a particular part of the full size image without having to access entire rows or columns of pixels. This advantageously allows a display node 100A that knows which portion of the original image is needed to output on its display 166 to fetch the level of detail needed, such as a sub-image and/or to quickly fetch the needed blocks that make up the image portion. Such blocks or tiles can be provided with identifiers that indicate the position of the bock or tile in the original image, and/or other characteristics. The image processing module 150 can be configured to store each sub-image of the original image as one or more layers of resolution to allow rapid access to a particular resolution layer without having to decompress or compress large resolution images for display, thereby improving efficiency. Storing multiple resolutions of the preloaded image can advantageously allow the use of parallel processing techniques (e.g., threading) to improve performance speed.

The image processing module 150 can be further configured to send requests to control node 102 for information about other display nodes (e.g., 100B, 100C, etc.) and/or vice versa. In some embodiments, messages can be exchanged between the control node 102 and/or other display nodes (e.g., 100B, 100C, etc.) that include information about the overall state of the aggregate tiled display, or about a particular display node. In some embodiments, the messages comprise Scalable Parallel and Distributed Systems (SPDS) messages. SPDS Messaging is a C++ library that encompasses sockets and data into abstractions called Endpoints and Messages. In some embodiments, the control path uses multicast UDP Endpoints, which means Messages are received by one or more subscriber nodes. Broadcast UDP Endpoints can also be used to send Messages to all nodes on a subnet. The SPDS Messaging library can use Unix/Winsock socket operations to implement the Endpoints and the send and receive operations used to transfer Messages.

The display node 100A can also execute instructions in the image display module 155 to display one or more images or portions thereof and manipulate the images. As noted above, an original image that is full size can be preprocessed by the image processing module 150 and then stored in the processed image data source 162 or in other local memory (e.g., memory 130). Because the amount of data loaded into memory 130 can be reduced when an original image is stored in a hierarchical format (such as tiled pyramidal TIFF), the image display module 155 can enable a highly interactive display space that spans multiple display nodes 100. By storing the data in a hierarchical format, the tiled display system 50 can implement further parallel processing techniques (e.g., MIMD or SPMD techniques and/or multithreading) to improve system performance.

For example, the image display module 155 can load the appropriate sub-image of an original image in memory 130 and on the display 166. In some embodiments, surrounding blocks and blocks from higher and lower levels can also be pre-fetched for higher performance by the image display module 155. This can allow each display node 100A to support the display of more than one such image or portions thereof. For example, the image display module 155 can determine its individual display boundary based on the resolution layer determined by the image processing module 150 (e.g., the resolution layer having the smallest image size larger than the native resolution of the display 166). Based on the determination of the individual display boundary, the image display module 155 can determine which tiles overlap with its display boundary and can fetch the overlapping and/or surrounding blocks, or tiles. Additionally, a resource management approach can support interactivity by reducing the amount of data loaded and allowing portions of several images to be resident on each tile, thus supporting display and manipulation of multiple large images.

Advantageously, the image display module 155 can be configured to allow the use of multiple highly detailed images, which can exceed billions of pixels, to be displayed as part of a high resolution, coordinated workspace on a tiled display that includes multiple display nodes 100. Further, the image display module 155 can be configured to allow in real-time or in near real-time interaction with multiple images by allowing moving, zooming, rotating, color filtering, and transparency controlling of images on the display node 100. In some embodiments, the image display module 155 can be configured to perform color filtering, shading or transparency control using a vertex and/or pixel shader, such as a Cg shader.

For example, in some embodiments, the user may use a front end interface, such as the control node 102, and select to rotate an image on the tiled display. In some embodiments, the user can manipulate the display via user input devices 151 (for example, a keyboard or 3D mouse). The image display module 155 can respond to the user's selection, by using a reduced size or reduced resolution version (e.g., thumbnail) of the original image, which may be stored in the processed image data source 162, to quickly adjust its display 166. For example, when the image on the system is initially selected for rotation, the image display module 155 can replace the image being displayed with the thumbnail during the rotation process. In some embodiments, as the thumbnail of the original image is rotated and thus redrawn at different angular orientations, less processing power is required to complete the redraw process, thereby providing a quicker response time. In some embodiments, an increased resolution image can be displayed upon completion of the rotation or other manipulation of the image. Additionally, user manipulations such as those noted above, can be used to generate messages sent to the control nodes, described in greater detail below.

In addition, the image display module 155 can also be configured to exchange messages with the control node 102 or the other display nodes (e.g., 100B, 100C, etc.) about the state of the tiled display, such as which portion of the original image needs to be displayed by respective nodes. Thus, the image display module 155 can provide a highly interactive experience that has numerous applications, including the manipulation of data about medical conditions, cancer cells, satellite images, geosciences, oil monitoring, weather monitoring or prediction, astronomy, and the like.

Although FIG. 1B has been described with respect to display nodes 100, a control node 102, and an image data source 164, certain of the features of the system shown in FIG. 1B can be implemented using other types of computing devices communicating over the network 160. For example, the control node 102 can communicate over the network 160 with a media source device (instead of the image data source 164) and one or more destination computing devices (instead of the display nodes 100). The control node 102 can broker a connection between the media source device and a destination computing device. In some embodiments, the control node 102 locates media data stored on the media source device and obtains the media data or a portion thereof (such as a thumbnail) from the media source device. The control node 102 can also be configured to send the media data or the portion thereof to the destination computing device, along with network communication or connectivity data. The network communication data can enable the destination computing device to communicate with the media source device to obtain media data. The network communication data could include, for example, a network address (such as an IP address) of the media source device, a proxy for the media source device, an anycast IP address for a plurality of media source devices, or the like.

In some embodiments, providing the network communication data from the control node 102 to the destination computing device enables the destination computing device to obtain media, including media updates, from the media source device. As a result, the control node 102 can be less of a bottleneck for communications between the media source device and the destination computing device.

In some embodiments, the destination computing device can report or otherwise provide the media updates it receives or a portion thereof to the control node 102. For example, the destination computing device can provide a thumbnail, a reduced frame rate video, metadata associated with the media updates, combinations of the same, and the like. The control node 102 can therefore keep track of the media data provided to the destination control device.

In some embodiments, the control node 102 can provide network communication information to the media source device instead of or in addition to providing communication information to the destination computing device. This network communication information can allow the media source device to communicate with the destination computing device. For example, the control node 102 can provide a network address of the destination computing device to the media source device. The media source device can then push media to the destination computing device.

In some embodiments, the control node 102 can identify media stored on the media computing device without requesting the media. The control node 102 can provide network communication data to the destination computing device, which allows the destination computing device to obtain the media from the media server. Thus, little or no media might pass through the control node 102 from the media source device to the destination computing device, further reducing bottleneck effects of the control node 102.

In some embodiments, the interactive tiled display system 50 can also be configured to support other data formats, in addition to large digital images. For example, the interactive tiled display system 50 can be configured to support and display Normalized Difference Vegetation Index (NDVI) data, MRI scan data, SOAR 3D terrain data, digital video data (including standard and HDTV format), and streaming content (e.g., from a webcam).

The interactive tiled display system 50 can also be configured to display a real-time replica of content displayed on the display screen of one or more computing devices in communication with the network 160, as described in U.S. patent application Ser. No. 12/487,590 entitled "Systems, Methods, and Devices for Dynamic Management of Data Streams Updating Displays," the entire content of which is hereby expressly incorporated herein by reference in its entirety. In some embodiments, the interactive tiled display system 50 comprises middleware that can be configured to render and display an OpenGL application by executing instructions to launch and manage instances of the OpenGL application on each of the display nodes 100 in parallel through a thread-based network communication layer.

Figure 2:
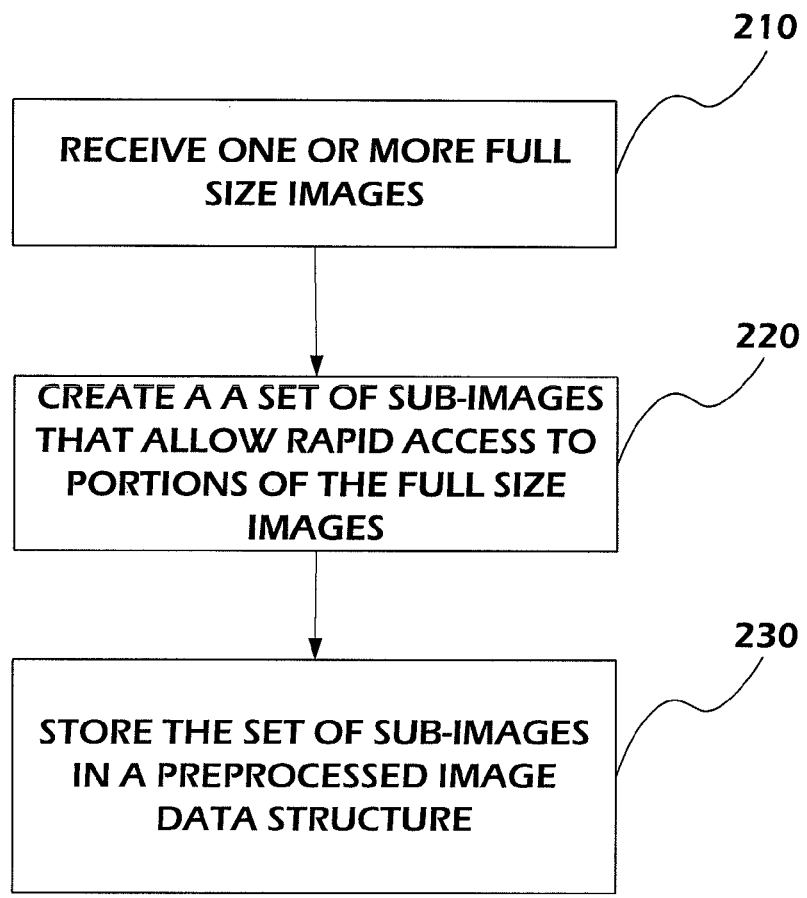
FIG. 2 is a flow chart illustrating an embodiment of a method for processing one or more images for display on an array display.

FIG. 2 is a flowchart illustrating an embodiment of a method of preprocessing images that can provide a high level of interaction and manipulation of the images on tiled display systems. The method illustrated in FIG. 2, as well as other methods disclosed below, can be stored as process instructions (for example, on any type of computer-readable storage medium) accessible and executable by the image processing module 150 and/or other components of the display node 100A, the control node 102, or any other computer or system connected to the tiled display system 50 directly or over any type of network. Depending on the embodiment, certain of the blocks described below can be removed, others may be added, and the sequence of the blocks can be altered. In some embodiments, each of the display nodes 100 can be configured to perform the method, as well as other methods discussed below, using parallel processing techniques to improve system performance.

Beginning at block 210, one or more full size or "original" images is received by each of the display nodes 100. In some embodiments, the one or more full size images can be sent from the original image data source 164 to the display nodes 100 by way of the control node 102. The full size images can also be sent over the network 160 from a computing device or received via a physical I/O port of the display node 100A, such as a USB port.

The full size images can include various types of data for visualization, such as still photographs, videos, or other images of anything including but without limitation, medical, satellite, geosciences, oil, weather monitoring or prediction, astronomy imagery, and include those discussed above with reference to FIG. 1B. As those of skill in the art will recognize, the image types can vary greatly and be based on a variety of possible types of data. After the full size images are received in operation block 210, the process can move to block 220.

In block 220, a set of sub-images that allow for rapid access to portions of the one or more full size images can be created. In some embodiments, the image processing module 150 preprocesses each original full size image and creates a set of sub-images that are a reduced size and/or reduced resolution (e.g., thumbnail) version of the original image. For example, a sub-image can be formed from a cropped portion of the original image, at the same resolution of the original image. For example, a 10240×7680 pixel image can be stored as 256×256 pixel tiles. In such an embodiment, the overall image comprises 40×30 tiles, or sub-images, each comprising 256×256 pixels. Other tile sizes can also be used. In some embodiments, the tiles can be roughly square. In other embodiments, the tiles can be comprise rectangular strips. Storing the image data as sub-images of smaller tile sizes can reduce the total amount of data to be processed for display on each of the display nodes 100.

Each of the display nodes 100 can be configured to only decompress or otherwise "process" the tiles necessary to cover its display area rather than decompressing or processing the entire image. For example, each of the display nodes 100 can be configured to process groups of the tiles that correspond to the respective portions of the image to be displayed on each display unit. In operation, each of the groups can comprise different subsets of all the tiles, although not necessarily exclusive groups. For example, groups associated with two adjacent display units may have one or more tiles in common.

Storing the image data in a tiled format can advantageously allow faster processing when the zoom level of the image is increased to show more precise detail. For example, instead of processing the lower zoom level portion of the image displayed on a particular display node, the display node can be configured to process only the tiles corresponding to the higher zoom level portion of the image. In some embodiments, if a particular tile overlaps a boundary between adjacent display nodes, each of the display nodes containing a portion of the image on the overlapping tile can process the same overlapping tile.

In some embodiments, the sub-images can comprise multiple resolution layers of the original full size image. A first sub-image can be created that is the same resolution as the original image, a second sub-image can be created that is half the resolution of the first sub-image, a third sub-image can be created that is half the resolution of the second sub-image, and so on. For example, a 10240×7680 pixel image can be stored in five resolution layers as follows:

Layer 0: 10240×7680
Layer 1: 5120×3840
Layer 2: 2560×1920
Layer 3: 1280×960
Layer 4: 640×480

In some embodiments, the resolution layers can also be processed into tiles or tiled sub-images. Storing the image in multiple layers of resolution can advantageously improve efficiency. For example, if the resolution of the display 166 is much smaller than the resolution of the image, the display 166 can only show the detail at the lower resolution and actual pixel details of the image are lost. In some embodiments, it can be advantageous to decompress a lower resolution layer of the image than the original high resolution image.

In some embodiments, the image processing module 150 can create sub-images of neighboring portions of the large image. For example, the image processing module 150 can create sub-images of portions of the large image to be displayed on neighboring display nodes. This can advantageously result in improved processing efficiency when the image is manipulated (e.g., rotated, panned, or resized) by a user and one of the sub-images overlaps a border between two adjacent display nodes. After the operation block 220, the process can move to block 230

In block 230, the set of sub-images can be stored in the processed image data structure 162 or in memory. In some embodiments, each sub-image can be stored in a hierarchical format (e.g., tiled pyramidal TIFF), such that one or more blocks, or tiles, allow rapid access to a particular part of the image without having to access entire rows or columns. In some embodiments, this can advantageously allow a display node 100A of the tiled system that knows the portion of an image it needs to display to fetch exactly the level of detail, for example a corresponding sub-image, and/or to quickly fetch the needed tiles that make up the image portion to be displayed. The sub-images can include a spatial and/or resolution identifier to allow for quick retrieval from the processed image data structure 162. In some embodiments, the sub-images (e.g., tiles) can be identified and retrieved based on a position command, coordinate, or value received in a message from the control node 102 (e.g., a "requested position"). For example, if the size of each tile is 256×256, a position coordinate of (0,0) or (124,0) can return the first tile and a position coordinate of (256,0) or (300,0) can return the next tile down on the x-axis. The identification and retrieval of tiles can be an operation supported by the TIFF software library (libTIFF).

In some embodiments, the image data (which can be divided into sub-images of various resolution layers and tiles) is stored as a single file format, with the sub-images being capable of being retrieved by the TIFF software library. In other embodiments, each of the sub-images can be stored individually, for example, in a directory file system. For example, each resolution layer can be a different level of directory in a file system, with each directory including all of the tiles for that resolution layer.

Figure 3:
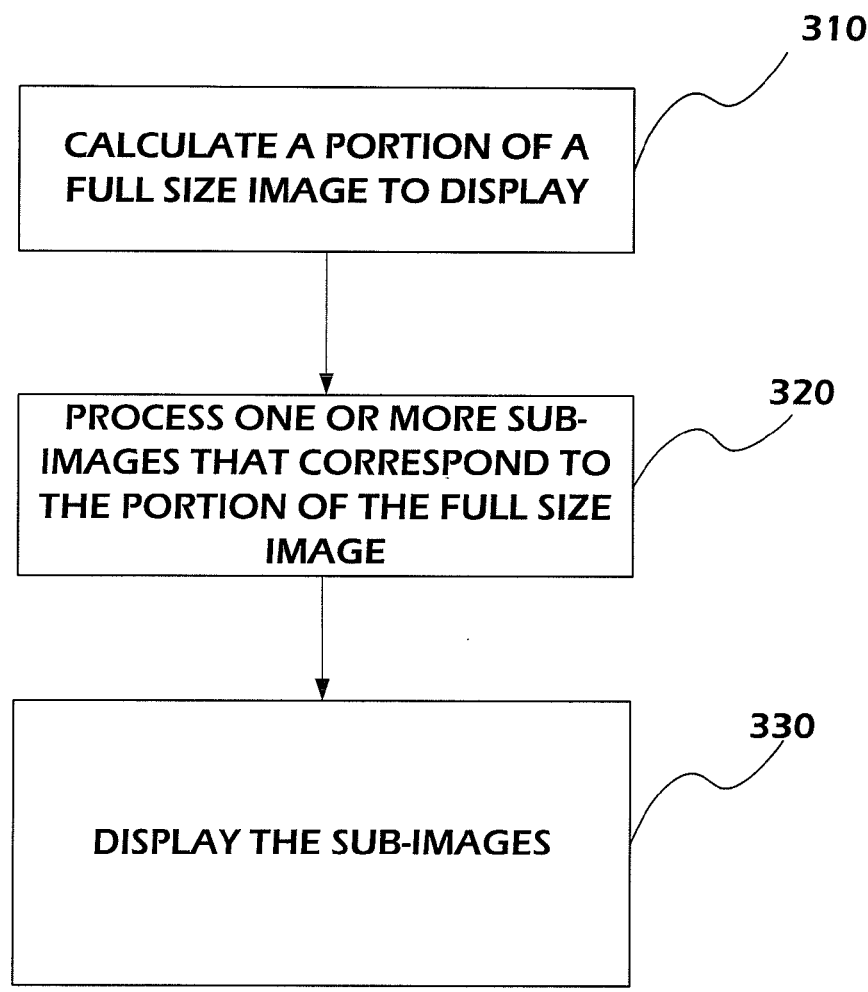
FIG. 3 is a flow chart illustrating an embodiment of a method for displaying an image on an array display.

FIG. 3 schematically illustrates an embodiment of another method of displaying and manipulating images on a tiled array display system. Depending on the embodiment, certain of the blocks described below may be removed, others may be added, and the sequence of the blocks may be altered. In some embodiments, each of the display nodes 100 can be configured to perform the method in parallel, thereby resulting in faster display and movement of the overall image.

Beginning at block 310, a portion of a full size image to display on a particular display node (e.g., display node 100A) can be calculated or determined. Additionally, multiple portions of one or more full size images to display can also be calculated or determined. Advantageously, this reduces the amount of data to be loaded on each particular display node 100, as well as a controlling computer, such as the control node 102, and thus increases the responsiveness of the overall tiled array display. Because of the increased responsiveness, manipulation of images on the tiled array display can be improved.

Moving to block 320, the one or more sub-images that correspond to the portion of the full size image to display are loaded into memory 130, for example. Because disk access times for loading a full size image can be impractical, each display node 100A can load tiles or blocks of the appropriate sub-images needed for its local portion of the overall tiled display. In some embodiments, the correct portions of multiple full size images can also be loaded into the memory 130 of the corresponding display node 100A, 100B, 100C, etc. The loading of tiles can advantageously be performed using parallel processing techniques, such as multithreading. Multiple threads can be used to simultaneously load the requested tiles from the processed image data source 162 or from the mass storage device 120 or other memory/file system.

Moving to block 330, the one or more sub-images are displayed. In some embodiments, the display node 100A may render the sub-images resident in the memory 130 using a multimedia device 140, such as a video card. The rendered sub-images can then be placed on display 166, such as an LCD monitor.

Figure 4:
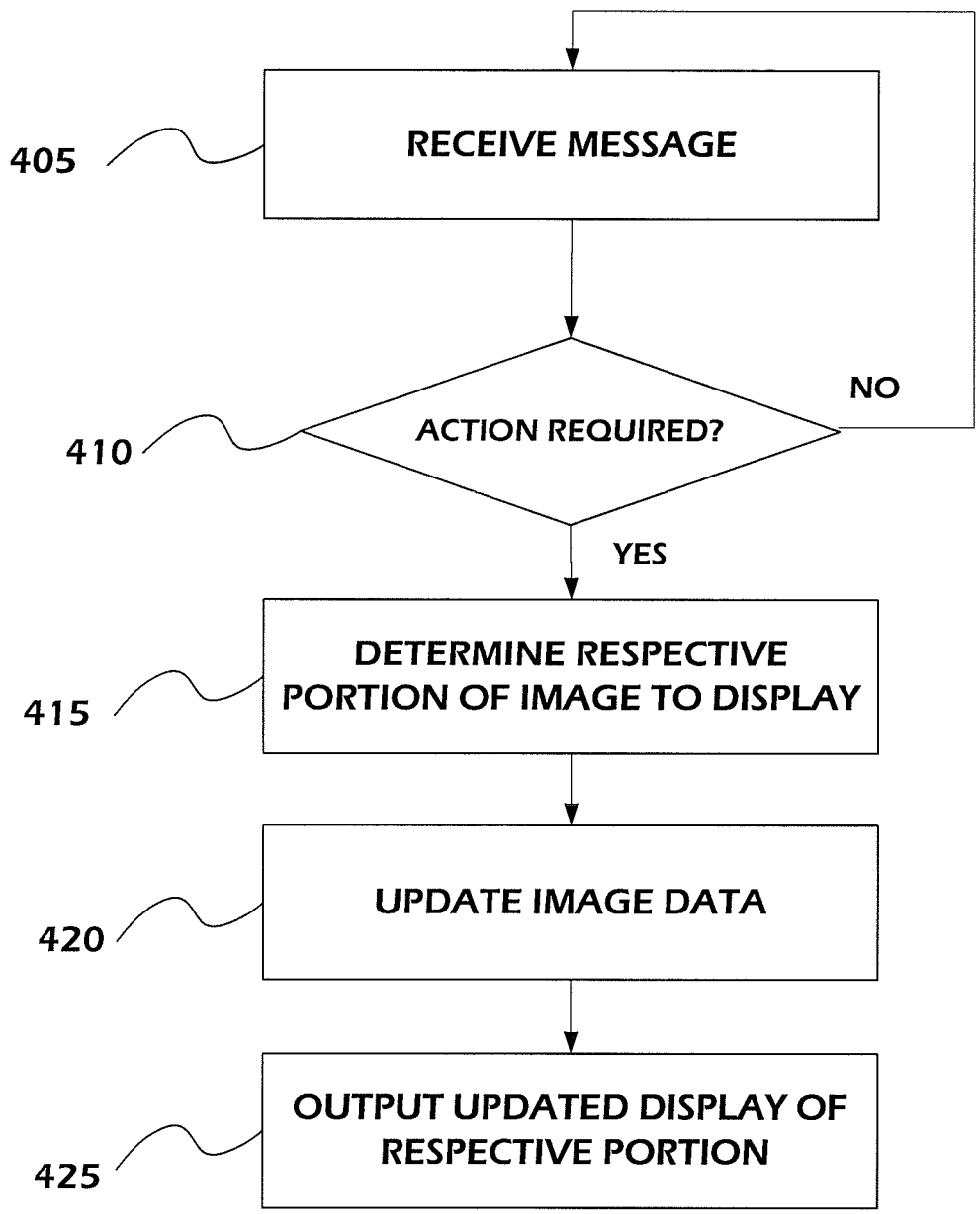
FIG. 4 is a flow chart illustrating an embodiment of a method for controlling the display of one or more images on an array display.

FIG. 4 schematically illustrates an embodiment of a method of controlling the display of one or more large images (e.g., hundreds of megapixels or larger) on an interactive tiled array display. Depending on the embodiment, certain of the blocks described below may be removed, others may be added, and the sequence of the blocks may be altered. Although the method is described with reference to a single display node 100A, the method can be performed by any of the display nodes 100. In some embodiments, each of the display nodes 100 can be configured to perform the method in parallel, thereby resulting in faster display and movement of the overall image.

At Block 405, the display node 100A receives a message (e.g., a command, data, packet, etc) from the control node 102, or another source, via the network 160. The message can be sent over the network 160 by any number of communication mechanisms, for example, TCP/IP over Ethernet or specialized high-speed interconnects, such as Myrinet. In some embodiments, the message contains information regarding an image to be displayed, or an image that is currently displayed, on the tiled array display.

For example, the message can comprise initial display parameters designated for an image that has not yet been displayed or an image that is currently being displayed. Such display parameters can comprise data indicating a desired or requested position for the corresponding image. Hereinafter, the content in the message indicative of the "position" included in the message is referred to as a "requested position."

Figure 6:
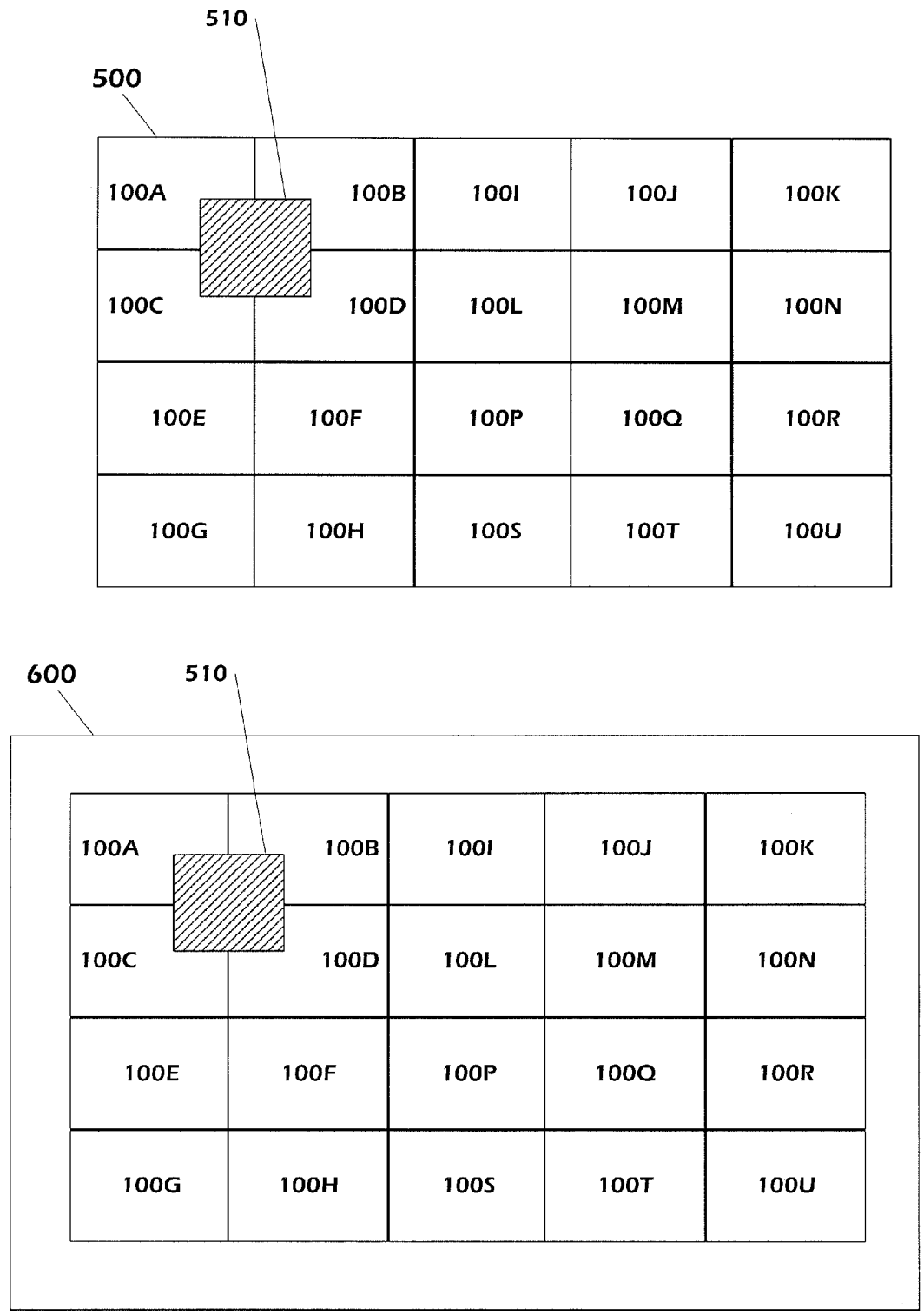
FIG. 6 is a schematic diagram of a tiled array display and a control node, the control node including a user interface having a schematic representation of the tiled array display.

Such a "requested position" could be generated by the control node 102 when a user places, drags to, or clicks on a representation of a subject image (510 in FIG. 6) on a wire frame representation of the array 10 on a user interface 600 (FIG. 6). In such an example, the user interface 600 can calculate, estimate, etc., the location of a reference pixel in the image 510 on the array 10.

The reference pixel of the image 510 can be any pixel of the image. In some embodiments, the reference pixel can be the center pixel of the image, or a pixel immediately above, below, left or right of the center of the image, if the image does not mathematically have a center pixel. Other reference pixels or reference parts of the image can also be used.

The portion of the message indicative of the requested position can be in any form. For example, the "position" can be expressed as a row and column of a virtual pixel grid representing all the pixels of the entire array 10. In some embodiments, the requested position can be indicative of a pixel on a particular display unit, e.g., pixel 1, 1 on display unit 100G. Other formats can also be used.

The message can also include other aspects of the requested position, such as angular orientation. For example, the message can include data indicative that the image should be rotated by an angle. The angle can be relative to the reference pixel, such as the center pixel noted above, any other pixel of the image, or any other point of reference.

The message can include further aspects of the requested position, such as zoom or magnification. For example, the message can include an indication that the image should be presented in a 1 to 1 manner, e.g., every pixel of the image represented on a respective single pixel of the corresponding display units. The message can also include other data indicative of other display parameters.

In some embodiments, the message can contain image data, for example, streaming video data, still image data, or a live display feed from a computing device or other data source in communication with the display nodes 100 via the network 160 as described in U.S. patent application Ser. No. 12/487,590 entitled "Systems, Methods, and Devices for Dynamic Management of Data Streams Updating Displays," the entire content of which is hereby expressly incorporated herein by reference in its entirety.

With continued reference to Block 405, the message can be received via broadcast, multicast, unicast, a reliable network overlay topology to parallelize transfer, or any other network messaging technique. In some embodiments, the multicast messages can be transmitted by unreliable multicast with error checking and handling. In some embodiments, the display nodes 100 can subscribe to a distribution group. For example, the display nodes 100 involved in displaying a portion of an image that does not cover the entire tiled display array can subscribe to, or join, a multicast group address.

After the display nodes 100 have joined a multicast group, they can receive the multicast messages sent to the multicast group address.

In some embodiments, the message can comprise a configuration message to initialize or reconfigure a coordinate system of the tiled array display. The configuration message can include a node identifier and a node coordinate. In some embodiments, the coordinate system can be determined using letters for the columns and numbers for the rows in spreadsheet fashion. For example, the top left display node can be A1, the display node just to the right of A1 can be B1, the display node just below A1 can be A2, and so on.

In some embodiments, the coordinate system can be based on a numerical method. For example, the top left display node can be (0,0) with a monitor size of (1.0, 1.0). The display node beneath the top left display node can be (0,1) with a monitor size of (1.0, 1.0). In some embodiments, different monitor sizes can be applied when using the numerical coordinate system. Such a coordinate system, or other coordinate systems can be used to allow each of the display nodes 100 to determine which portion of an image to display on its associated display 166, as also described above.

In other embodiments, the display nodes 100 can be "preconfigured." For example, the control node 102 can remotely access each of the display nodes 100 (for example, using virtual network computing (VNC) software) and rename, or otherwise configure, the display nodes 100, according to a predefined display configuration scheme (for example, the coordinate systems described above).

In some embodiments, the message received from the control node 102 can also comprise a state message. State messages can be received at periodic intervals or any time a change in a state of an image occurs (for example, due to user interaction or manipulation of the image on the user interface 600, FIG. 6). The state message can be received via broadcast to all of the nodes, multicast to a subset of the nodes, or unicast to a single node.

The state messages can include state values of the image to be displayed or updated state values of the image currently being displayed. The state values can include values regarding image position, image size, image resolution, image cropping, angle of rotation, pixel colorimetry or shading, transparency and/or other display parameters. For example, as described above with regard to messages generally, the state values can include X and Y values to indicate a position of the image. In some embodiments, the X and Y values can indicate a delta change in position, or offset, from the previous position. Received X and Y values can also indicate an updated location of the central pixel or another reference pixel of an image. In some embodiments, the X value indicates the left boundary of the image and the Y value indicates the top boundary of the image. The X and Y values can be represented in resolution units or coordinate values, for example.

Additionally, X and Y values can be used to indicate a size of the image on the overall tiled display. For example, the message can include two sets of X and Y values, indicating the locations of two reference pixels in the image. In an example, the two sets of X and Y values can indicate the locations of two opposite corners of the image. However, reference positions of any two reference pixels in the image could also be used. The X and Y values can be updated to accommodate panning of the image around the tiled array display.

The state values can include a Z value to indicate a zoom level or "magnification" of the image. The Z value can be updated to accommodate resizing of the image by zooming in and out. In some embodiments, the Z value can be used to determine the appropriate resolution layer to access as a starting point for processing of the image, as described in more detail above. For example, the resolution level just larger (in both height and width) than, or equivalent to, the specified zoom level can be selected as the starting point. As noted above, the state values can also include an angle value. The angle value can be used to indicate a requested angle of rotation of the corresponding image. The angle value can be updated to accommodate rotation of the image on the tiled array display.

In some embodiments, the state values can include colorimetry values of the image pixels. In some embodiments, the colorimetry values can include red, green, and blue (RGB) color values. In other embodiments, other color schemes, such as CMYK, can be used. The colorimetery values can also include information configured to adjust other parameters or viewing conditions of the image or to transfer from one color scheme to another, such as chromacities or transfer functions. The colorimetry values can be updated to accommodate color filtration. Color filtration can advantageously be used to expose new visual information or to match desired aesthetics (for example, for medical image data). The state values can also include an alpha value to indicate a level of transparency of the pixels. The alpha value can be used to accommodate adjustment of the transparency of the image (from fully opaque to fully transparent) and to accommodate visual overlays of multiple images.

When multiple images are being displayed on the tiled array display and state messages are being sent via broadcast, multiple state messages can be transmitted, with each broadcast including an ID of the image to which it pertains in addition to the state values of the image and multiple state messages can be sent. Other image values can also be included within the messages sent by the control node 102.

In some embodiments, as noted above, the message can include an image portion and a display parameter portion. The image portion can comprise image data, such as a computer file in the form of a compressed or uncompressed image, or an identification of an image that is already stored on local memory (e.g., 130 FIG. 1B) of the display units. The display parameter portion of the message can comprise commands or instructions regarding the display and rendering of the large digital image on the tiled array display. For example, the display parameter portion can include instructions indicating where the image is to be positioned on the tiled array display if it is not intended to take up the entire screen and/or at what resolution the image is to be displayed.

In some embodiments, the display parameter portion can include resolution information to indicate the resolution with which to display the large image. In other embodiments, the display nodes 100 can determine the appropriate resolution based on the native resolution of their associated displays 166 and the various levels of resolution of the received large image. In some embodiments, the display parameter portion can include colorimetery or transparency information.

At decision block 410, the CPU 105 of the display node 100A determines whether the state message impacts a display of an image or other data on its associated display 166. If no action is required by the display node 100A, then the display node 100A continues to receive the state messages. If, in decision block 410, it is determined that action is required, then the process continues to block 415.

For example, each of the display nodes can include a position module configured to store data indicative of any position in a tiled array display. For example, such a module can be anywhere in the memory system. Further, because there is no clear limit on the possible size of the array 10, the module can be configured to accept and retain an input indicative of any position on an array of any size. In some embodiments, the module can be embodied in software and accessible through a user interface, not illustrated.

In preparing a display node 100A for operation as a node in an arrayed display, such as the array 10, the display node 100A can be physically positioned in the array. For example, the display node 100A can be positioned adjacent other nodes in an array, such as the array 10. A user can also input at least a first data indicative of the position of the display node 100A in the array, the position module receiving and retaining the at least a first data or other data indicative of the position. For example, the user can remotely connect to the display node 100A through the use of VNC software, as described above, to indicate the position of the display node 100A in the array.

Each of the display nodes can also include one or more an image processing modules, such as the image processing module 150, which can be combined into a single module with the position module described above, or other modules described herein, can be separate from all other modules, or combined into any of various possible combinations of all of the modules described herein. In some embodiments, the module used for the determination performed in decision block 410 can be referred to as an "action required determination module."

In some embodiments, the image processing module 150 can be configured to process the message received in operation block 405 in order to determine if the information in the message is indicative of a request for the display unit to process and generate an image on its corresponding local display 106. In some embodiments, the display nodes 100 can generate a virtual map of the entire array 10, and calculate the boundaries of the image resulting from processing the image in the manner indicated in the message. In some embodiments, the resulting boundaries can be compared to the position of the node 100A retained in the position module, described above.

If the position of the resulting boundaries indicates that no part of the resulting image would lie on the display unit at the position in the array retained in the position module, then the result of decision block 410 is "NO", and the routine can return to operation block 405 and repeat. If, on the other hand, the result indicates that any part of the resulting image would lie on the display unit at the position in the array retained in the position module, then the result of decision block 405 is "YES" and the process can continue to operation block 415.

The display units can also be configured to perform other analyses on the information in the message. For example, if the message includes information indicating that only a portion of an image currently displayed on the display unit has changed, but the portion of the image displayed on the display unit performing the analysis has not changed, then the result determined in decision block 410 can also be "NO."

At block 415, each of the display nodes 100 can determine the respective portion of the large image that it is responsible for displaying based on the state values of the message. In some embodiments, each of the display nodes include a module for further processing the message received to determine what discrete part of the image is to be displayed on the display node performing operation block 415. For example, in a continuation of the operation described above with reference to decision block 410, or repeating all of those processes, the display node can determine which pixels of the image fall within its position in the above described virtual array.

In some embodiments, where the image file is stored on the local display node memory in a compressed format, the display node can decompress the entire image or only a discrete part of the image, depending on the compression format. Optionally, the display node can process the image file at the maximum resolution of the image, or at another resolution, for example, another resolution included in a pyramidal image data format.

In some embodiments, the display node can first calculate a mosaic representation of the image, using the boundaries of the sub tiles of the image noted above. In this example, the display unit can perform the determination of operation block 415 by determining which tiles or sub tiles of the image would be positioned on the display unit, if the image was oriented according to the message. In some embodiments, the display unit can be configured to determine that a sub tile would be positioned on the display unit if any portion of the sub tile would lie on the display unit if the image were positioned according to the message.

A determination, such as the above-described determination performed in operation block 415, can be performed by an image processing module, such as the image processing module 150, an additional module combined with the image processing module 150, a separate image processing module, or any other device or module configured to perform the functions described herein. The module used to perform the operation performed in operation block 415, can be referred to as a "portion identification module."

After determining the discrete portion of the image to display which could include the entire image, a specific list of pixels, a range of rows and columns of pixels, a list of sub tiles of the image, or another description of the discrete portion, the routine can continue to optional operation block 420.

At optional block 420, the display node 100A can update image data for display, if beneficial, for example, based on the state values of the message or based on the specific techniques used to perform the above steps. For example, if the Z value has changed (e.g., indicating a zoom in has been requested), new tiles or sub-images can be loaded to illustrate the increased detail of the image portion being displayed on the display node 100A. In some arrangements where new image data is received, the display node 100A can create one or more sub-images of the large image based on the image data corresponding to the portion of the large image that it is responsible for displaying.

In some embodiments, for example, where the display units perform the operation block 415 based on the position of tiles or sub tiles of the image, the display unit can process the tiles or sub tiles identified in operation block 415. As noted above, depending on information in the message, such as an indication of magnification, zoom, or other requested parameters regarding the display of the image, the display unit can selectively process the image data according to the identified tiles or sub tiles of a selected resolution or layer of the original image data, for example, where a the original image is in the form of a pyramidal resolution format image, with each of the different resolutions broken down into tiles or sub tiles. This technique can provide a further advantage in that, if an image spans at least two (2) display units such that two different portions are identified by these respective display units in operation block 415, neither of the display units need to process the entire image. Rather, the analysis of operation block 415 can be used to help the display units to efficiently determine which part of an image to process for display, without having to process, resolve, decompress, map, etc., the entire original image at full resolution.

One or more sub-images can be generated by the image processing module 150 as described above with respect to block 220 of FIG. 2. The created sub-images can be stored in memory or in a preprocessed image data structure, as described above with respect to block 230 of FIG. 2. The step of updating data in operation block 420 can include loading individual tiles, or sub-images via multithreading. For example, multiple tile threads can be configured to run in parallel to increase performance speed, as described above.

At block 425, the display node 100A outputs its respective portion of the large image on its associated display 166, thereby presenting a high-resolution rendering of the original large image on the tiled array display. When an image is being moved around the display quickly, certain tiles may not be loaded from a tile thread in time to display on the display 166, resulting in black tiles being displayed. Accordingly, in some embodiments, a lower or the lowest resolution layer image can be used, processed, displayed, etc., to temporarily mask the black tiles until the higher resolution tile is loaded from the tile thread.

In some embodiments, such as when an image spans multiple display nodes, the display nodes 100 can be configured to adjust their respective display output to compensate for the presence of bezels between the display nodes 100. For example, the display units can be configured to operate in two or more modes, such as an aspect ratio preservation mode or an image data preservation mode.

In an "aspect ratio preservation mode", in the decision block 410 and the operation block 415, the display units can use a map of all the pixels in the array 10 which includes virtual pixels that fill the gaps between adjacent display nodes. These virtual pixels are not assigned to any of the display nodes. As such, an image displayed on the array 10 which overlaps multiple display units will have portions of the image missing, i.e., any portion of a displayed image falling within the gaps formed by the bezels, would not be displayed. However, the portions of the image that are displayed will have the aspect ratio of the original image. As used herein, the term "unified display of the digital image on the array of display units" includes an image displayed as in the aspect ratio preservation mode, despite the missing data.

This mode can be desirable when viewing images for aesthetics, images or art, architecture, etc., for example, because the alignment of features which span bezels will be preserved, as well as other applications. However, the image data preservation mode, described below, can also be desirable for viewing images for aesthetic reasons.

In an "image data preservation mode", in the decision block 410 and the operation block 415, the display units can use a map of all the pixels in the array 10 which does not include or utilize unassigned pixels in the gaps between adjacent display nodes. Instead, every pixel of the original image to be displayed on the array 10 is assigned to a display node. As such, the aspect ratio of an image displayed on the array 10 which overlaps multiple display units will be affected/distorted, in the portion spanning the bezels between the displays (166 FIG. 1B) of the display nodes. However, the portions of the image that are displayed will have the aspect ratio of the original image. As used herein, the term "unified display of the digital image on the array of display units" includes an image displayed as in the image data preservation mode, despite the distortion on the resulting aspect ratio.

This mode can be desirable for scientific analyses of images because all of the image data is displayed, regardless if an image spans a bezel. However, the aspect ratio preservation mode can also be helpful in scientific analyses, for example, where it is desired to compare proportional sizes of features of one or more images.

In some embodiments, the display nodes 100 can be configured to activate one or a plurality of predetermined functions to change the position and/or size of the image to conform to one or more physical or logical boundaries of the tiled array display, such as the "snapping" function described in U.S. Provisional Application 61/218,378, entitled "Systems, Methods, and Devices For Manipulation of Images on Tiled Displays," the entire content of which is hereby expressly incorporated herein by reference.

Figure 5:
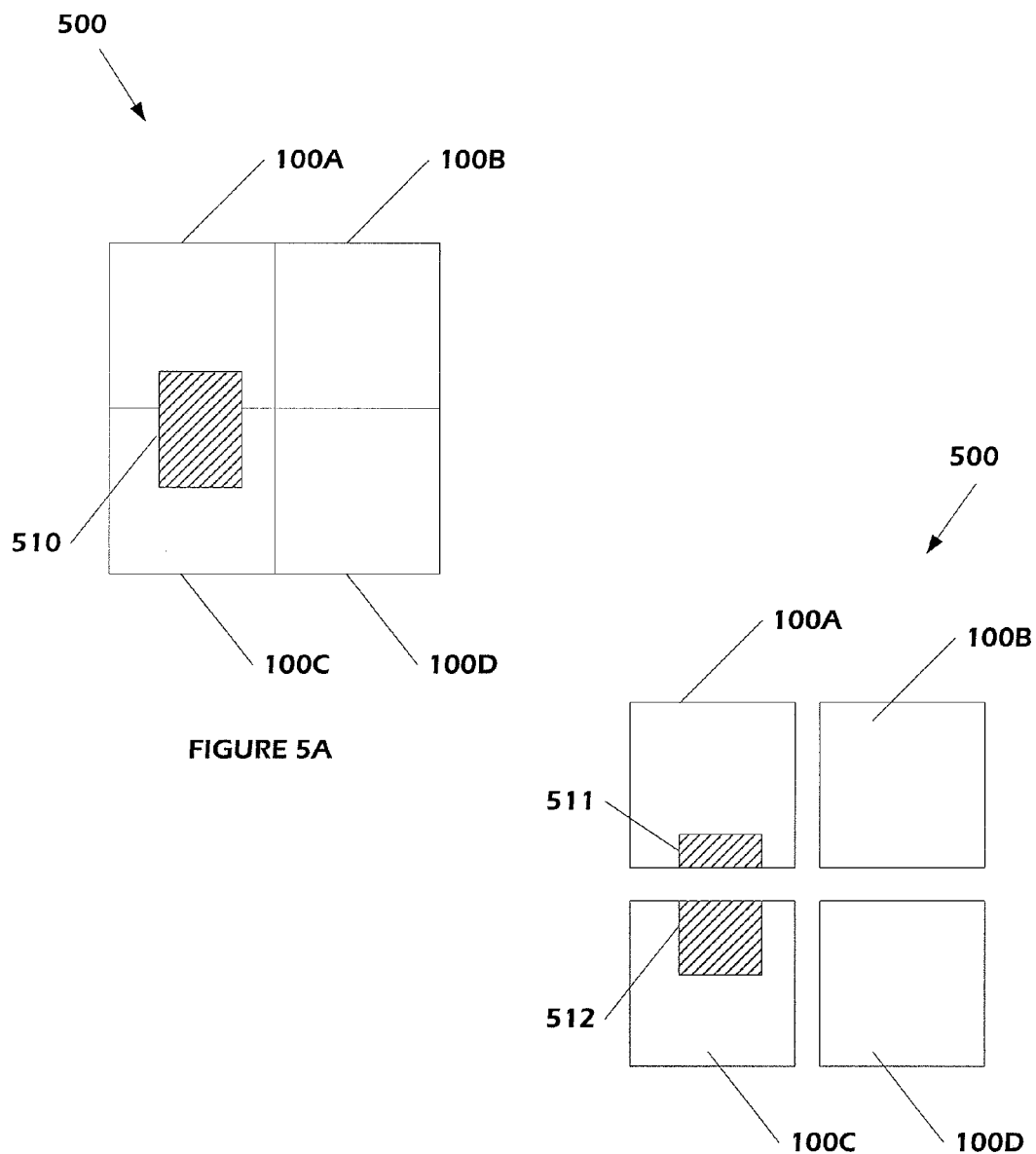
FIG. 5A schematically illustrates an image overlapping two display nodes in an array display.
FIG. 5B schematically illustrates the image of FIG. 5A partitioned over two display nodes.

FIGS. 5A and 5B schematically depict how an image can be displayed on one or more display units 100A, 100B, 100C, 100D of a tiled array 500. The tiled array 500 can be in the same form as the array 10, or another form.

As depicted in FIG. 5A, an image 510 can be displayed in such a manner that it overlaps two display units 100A and 100C of the array 500. As further detailed in FIG. 5B, if the array 500 is only displaying an image on a limited number of the total number of display units, such as only the units 100A and 100C, then the associated image data from the image source can be selectively sent to those display units 100A and 100C (e.g., via a multicast message). This can help reduce bandwidth requirements for transmission of image data.

For example, with continued reference to FIGS. 5A and 5B, the image 510, when overlapping two display units 100A, 100C, can be broken down into parts corresponding to those portions displayed on different display units. As shown in FIG. 5B, the image 510 can be segregated into a first portion 511 (displayed on display unit 100A) and a second portion 512 (displayed on display unit 100C). As such, in some embodiments, the tiled array 500 can be configured to send the image data corresponding to the portion 511 to the display unit 100A and the other image data corresponding to the portion 512 to the display unit 100C, along with data indicating the position at which these portions 511, 512 should be displayed.

As such, the image data corresponding to the image 510 does not need to be broadcast to the other display nodes (e.g., 100B, 100D). Rather, in some embodiments, the control node 102 can be configured to only send image data to those display nodes in the array 500 that will be involved in displaying at least a portion of the image 510 (e.g., via multicast). This can greatly reduce the magnitude of data flowing into and out of each of the display nodes 100.

With reference to FIG. 6, in some embodiments, the control node 102 can be configured to generate a schematic representation of the display nodes 100 for use as a graphical user interface. In some embodiments, the control node 102 can be configured to display the images being displayed on the tiled array display on its own associated display, such as a display monitor 600. The display monitor 600 of the control node 102 can comprise a wire frame 605 of the tiled array display 500. In other embodiments, the display monitor 600 of the control node 102 can include other visual cues for representing the borders of the individual displays 166 of each display node of the tiled array display. As shown in the lower portion of FIG. 6, the image 510 can be displayed both on the tiled array display 500 and the display monitor 600 of the control node 102. The representation of the image 510 on the control node display 600 can be in the form of a reduced resolution version of the image 510, a full resolution version, a thumbnail version, or other versions.

The display monitor 600 of the control node can have any amount of resolution. However, in some embodiments, the resolution of the display 600 of the control node 102 will be significantly less than the total resolution of the tiled array display 500 including all the individual display units 100A, 100B, etc.

Thus, the wire frame 605 schematically representing the tiled array display 500 can be presented on the display 600 of the control node 102 to provide an approximation of the proportions of the tiled array display 500. For example, if the tiled array display 500 provides a total of 19,200 pixels wide by 10,800 pixels high, the display 600 of the control node 102 might include $\frac{1}{10}^{th}$ of that resolution, e.g., 1,920 pixels wide by 1,080 pixels high, or other resolutions.

The wire frame display can be the same or similar to the schematic wire frame representation illustrated in FIGS. 5A and 5B. The control node 102 can be further configured to allow a user to manipulate the placement of an image, such as the image 510, on the tiled array display. For example, a user can resize, reposition, rotate, and/or adjust color filtration or transparency of the one or more images. In some embodiments, user interaction devices, such as a keyboard, mouse, 3D mouse, speech recognition unit, gesture recognition device, Wii remote, electronic pointing device, or haptic input device can be used to manipulate the one or more images on the tiled array display 500. An arrow pointer or other visual indicator can be displayed on the tiled array display to allow for manipulation of the images via the user interaction devices.

In some embodiments, the manipulation of the image 510 on the control node display 600 corresponds with the manipulation of the image on the tiled array display 500. For example, a user can provide inputs, for example, by employing a mouse based control to drag and drop images on the wire frame representation to change the position or orientation of images on the tiled array display 500. These inputs can be used by the control node 102 to generate the messages (e.g., state messages comprising image state values) described above.

The word "module," as used herein, refers to logic embodied in hardware or firmware, or to a collection of software instructions, possibly having entry and exit points, written in a programming language, such as, for example, Java, Lua, Objective-C, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

In addition the types of connections and couplings discussed above, any coupling or connection discussed herein could be a local area network, wireless local area network, wide area network, metropolitan area network, storage area network, system area network, server area network, small area network, campus area network, controller area network, cluster area network, personal area network, desk area network or any other type of network.

Any of the computers, laptops, server, including the proxy server, control nodes, workstation, or other devices herein may be any type of computer system. A computer system may include a bus or other communication mechanism for communicating information, and a processor coupled with bus for processing information. Computer system may also includes a main memory, such as a random access memory (RAM), flash memory, or other dynamic storage device, coupled to bus for storing information and instructions to be executed by processor. Main memory also may be used for storing temporary variables or other intermediate information during execution of instructions to be executed by processor. Computer system may further include a read only memory (ROM) or other static storage device coupled to a bus for storing static information and instructions for processor. A storage device, such as a magnetic disk, flash memory or optical disk, may be provided and coupled to bus for storing information and instructions.

The embodiments herein are related to the use of computer system for the techniques and functions described herein in a network system. In some embodiments, such techniques and functions are provided by a computer system in response to processor executing one or more sequences of one or more instructions contained in main memory. Such instructions may be read into main memory from another computer-readable storage medium, such as storage device. Execution of the sequences of instructions contained in main memory may cause a processor to perform the process steps described herein. In alternative embodiments, hard-wired circuitry may be used in place of or in combination with software instructions to implement embodiments. Thus, embodiments are not limited to any specific combination of hardware circuitry and software.

The term "computer-readable storage medium" as used herein, in addition to having its ordinary meaning, refers to any medium that participates in providing instructions to a processor for execution. Such a medium may take many forms, including but not limited to, non-volatile media and volatile media. Non-volatile media includes, for example, optical or magnetic disks, such as a storage device. Volatile media includes dynamic memory, such as main memory. Transmission media includes coaxial cables, copper wire and fiber optics, including the wires that comprise bus.

Common forms of computer-readable media include, for example, a floppy disk, a flexible disk, hard disk, magnetic tape, or any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge.

Computer systems can send messages and receive data, including program code, through the networks or other couplings. The received code may be executed by a processor as it is received, and/or stored in storage device, or other non-volatile storage for later execution. The term "broadcast" as used herein, in addition to having its ordinary meaning, may refer to any transmission of information over a network. The term "multicast" as used herein, in addition to having its ordinary meaning, can include broadcasting information to a subset of devices in communication with a network.

Although the foregoing inventions have been described in terms of some embodiments, other embodiments will be apparent to those of ordinary skill in the art from the disclosure herein. Moreover, the described embodiments have been presented by way of example only, and are not intended to limit the scope of the inventions. Indeed, the novel methods and systems described herein may be embodied in a variety of other forms without departing from the spirit thereof. Accordingly, other combinations, omissions, substitutions and modifications will be apparent to the skilled artisan in view of the disclosure herein. Thus, the present inventions are not intended to be limited by the preferred embodiments.

What is claimed is:

1. A tiled display system comprising:
   an array of display units in communication with a network, each of the display units comprising an image display device and a processor, the image display devices being arranged in a tiled layout;
   a control unit in communication with each of the display units via the network, the control unit configured to transmit to the display units, a message indicative of a state of a digital image;
   wherein the processor of each of the display units is configured to determine a respective portion of the digital image to output on its respective image display device based at least in part on the message and to output the respective portions on the respective image display devices so as to collectively present a unified display of the digital image on the array of display units.

2. The system of claim 1, wherein all of the display units are configured to store the digital image in the form of discrete tiles, a combination of the tiles forming the entirety of the digital image.

3. The system of claim 2, wherein all of the display units are configured to define the respective portion of the digital image as a subset of the discrete tiles, and to process and display image data only from the subset of discrete tiles in response to the message.

4. The system of claim 1, wherein at least a plurality of the display units are configured to store the digital image in the form of discrete portions, a combination of the portions forming the entirety of the digital image.

5. The system of claim 4, wherein at least a plurality of the display units are configured to define the respective portion of the digital image as a subset of the discrete portions, and to process and display image data only from the subset of discrete portions in response to the message.

6. The system of claim 1, wherein at least a plurality of the display units are configured to store a plurality of copies of the digital image, the plurality of copies comprising data representing the digital image at different resolutions.

7. The system of claim 6, wherein at least a plurality of the display units are configured to selectively process and display at least a portion of one of the plurality of copies based on the message.

8. The system of claim 1, wherein the digital image comprises an image having at least 200 Megapixels.

9. The system of claim 1, wherein the message comprises one or more display parameters of the digital image.

10. The system of claim 6, wherein the one or more display parameters includes a location of a reference pixel of the digital image on the array of display units.

11. The system of claim 6, wherein the one or more display parameters include a zoom level of the digital image.

12. The system of claim 6, wherein the one or more display parameters include at least one of an indication of a size of the digital image, a pixel color value, and a pixel transparency value.

13. The system of claim 1, wherein the message comprises at least a portion of the digital image.

14. The system of claim 1, wherein the control unit is configured to broadcast the message to all of the display units.

15. The system of claim 1, wherein the control unit is configured to transmit the message to a plurality of the display units via a multicast message.

16. A method of presenting a large digital image on an array of display units, the array including a control unit communicating with each of the display units over a network, each of the display units comprising a display monitor and a processor, the method comprising:
   transmitting a message from the control unit to the display units, the message comprising at least one display parameter of a large digital image;
   storing at least a portion of the large digital image on a local memory of each of the display units;
   using a plurality of the display units in parallel to identify the respective portions of the large digital image to display on each of the respective display units, based at least in part on the at least one display parameter;
   using the respective ones of the plurality of the display units to process the identified respective portions of the large digital image; and
   using the respective ones of the plurality of the display units to output the respective portion of the large image on the respective display monitor of the display units in parallel, based at least in part on the at least one display parameter.

17. The method of claim 16, further comprising receiving the large digital image from an image data source in communication with the network.

18. The method of claim 16, wherein transmitting comprises transmitting a location of a reference pixel of the large image on the array.

19. The method of claim 16, wherein transmitting the message from the control unit to the display units comprises broadcasting the message to each of the display units.

20. The method of claim 16, wherein transmitting the message from the control unit to the display units comprises transmitting a multicast message to a plurality of the display units.

21. The method of claim 16, wherein transmitting the message from the control unit to the display units comprises transmitting a multicast message to at least one of the display units.

22. The method of claim 16, further comprising storing sub-images of at least a portion of the large image on each of the display units.

23. The method of claim 22, wherein storing comprises storing multiple resolution layers of at least a portion the large image.

24. The method of claim 22, wherein storing comprises storing a plurality of image blocks of at least a portion of the large image.

25. A method of presenting a large digital image on an array of tiled display nodes, each of the tiled display units comprising a display monitor and a processor, the array also including a control unit communicating with each of the tiled display nodes over a network, the method comprising:
   receiving a message from a control unit, the message comprising at least one display parameter of a large digital image;
   determining a respective portion of the large digital image to display on each of the display nodes in response to the message received, based on the at least one display parameter;
   using each of the display nodes in parallel to process groups of one or more stored sub-images corresponding to the respective portions of the large digital image;
   using each of the display nodes in parallel to output a display of the respective portions of the large digital image on the respective display monitors of each of the display nodes.

26. The method of claim 25, further comprising:
- receiving a second message from the control unit, the second message comprising a second display parameter; and
- updating the display based on the second display parameter, the second display parameter having a different value than the at least one display parameter.

27. A method of presenting a plurality of digital images on a parallelized array of display units, each of the display units comprising a display monitor and a processor, and a control unit communicating with each of the display units over a network, the method comprising:
- transmitting a first message from the control unit to a first subset of the display units, the first message comprising a first set of display parameters of a first digital image;
- transmitting a second message from the control unit to a second subset of the display units, the second message comprising a second set of display parameters of a second digital image;
- identifying a respective portion of the first digital image on each of the display units of the first subset to output for display based at least in part on the first set of display parameters;
- identifying a respective portion of the second digital image on each of the display units of the second subset to output for display based at least in part on the second set of display parameters;
- outputting the respective portion of the first digital image on the display monitor of each of the display units of the first subset in parallel based at least in part on the first set of display parameters, and
- outputting the respective portion of the second digital image on the display monitor of each of the display units of the second subset in parallel based at least in part on the second set of display parameters.

28. The method of claim 27, wherein the first message and the second message comprise broadcast messages.

29. The method of claim 27, wherein the first message and the second message comprise multicast messages.

30. A display unit configured to operate as a node of an arrayed display system which can be formed of a plurality of the display units physically mounted adjacent to each other in a tiled layout, the display unit comprising:
- a housing;
- an image display device connected to the housing;
- at least one processor operably connected to the image display device;
- a memory system comprising at least one memory device configured to store at least one digital image and operably connected to the processor;
- at least one network communication device operably connected to the processor and configured to receive at least one message transmitted over a network, the message including data indicative of a movement of an image that can be displayed on arrayed display system comprising a tiled display arrangement larger than the image display device; and
- a portion identification module configured to access at least one digital image that can be stored in the memory system, the portion identification module also being configured to identify a portion of the at least one digital image, the portion being less than an entirety of the at least one digital image, in response to information in a message received by the network communication device and based on a portion of an arrayed display system corresponding to the display unit.

31. The display unit of claim 30, wherein the memory system is configured to store a plurality of independently readable portions of a digital image, a combination of all of the independently readable portions forming an entirety of the digital image.

32. The display unit of claim 30, wherein the portion identification module is configured to identify the portion of the digital image as comprising a sub set of a plurality of independently readable portions of the digital image, a combination of all of the independently readable portions forming an entirety of the digital image.

33. The display unit of claim 30, wherein the portion identification module is configured to determine positions of boundaries of at least one digital image stored in the memory system, positioned in accordance with data indicative of a requested position in an arrayed display system received by the at least one network communication device.

\* \* \* \* \*